United States Patent [19]

Bachinski

[11] Patent Number: 4,803,893
[45] Date of Patent: Feb. 14, 1989

[54] HIGH SPEED ROTOR BALANCE SYSTEM

[75] Inventor: Robert A. Bachinski, Palm Beach Gardens, Fla.

[73] Assignee: United Technologies Corporation, Hartford, Conn.

[21] Appl. No.: 100,793

[22] Filed: Sep. 24, 1987

[51] Int. Cl.⁴ ............................................. F16F 15/22
[52] U.S. Cl. .................................... 74/572; 74/573 R; 416/144; 416/500; 415/119
[58] Field of Search ...................... 74/573 R, 572, 574; 416/144, 500; 415/119, 500, 219 C, 219 R, 219 B, 219 A

[56] References Cited

U.S. PATENT DOCUMENTS

| | | | |
|---|---|---|---|
| 2,575,237 | 11/1951 | Sollinger et al. | 230/122 |
| 3,097,824 | 7/1963 | Bunger et al. | 416/144 |
| 3,888,601 | 6/1975 | Glassburn | 416/144 |
| 3,974,700 | 8/1976 | Webb | 416/144 |
| 3,985,465 | 10/1976 | Sheldon et al. | 416/144 |
| 4,220,055 | 9/1980 | Dubois et al. | 74/573 |
| 4,294,135 | 10/1981 | Tameo | 74/573 R |
| 4,457,668 | 7/1984 | Hallinger | 416/500 |
| 4,480,957 | 11/1984 | Patel et al. | 416/500 |
| 4,480,959 | 11/1984 | Bourguignon et al. | 416/500 |

FOREIGN PATENT DOCUMENTS

| | | | |
|---|---|---|---|
| 596159 | 4/1960 | Canada | 416/144 |
| 700996 | 12/1964 | Canada | 416/144 |
| 2737040 | 1/1979 | Fed. Rep. of Germany | 416/144 |
| 0624130 | 9/1978 | U.S.S.R. | 74/573 R |
| 600498 | 4/1948 | United Kingdom | 416/144 |
| 805371 | 12/1958 | United Kingdom . | |

Primary Examiner—Richard E. Moore
Assistant Examiner—Vinh Luong
Attorney, Agent, or Firm—Edward L. Kochey, Jr.

[57] ABSTRACT

A balance system for a high speed bladed rotor includes a collar (28) with an inwardly facing groove (30). Balance weights (36) are located in the groove with a cover plate (44) retaining the weights and covering the weights, groove and slots (32) in the collar. A compact arrangement is achieved with the weight close to the disk and windage losses are reduced.

3 Claims, 2 Drawing Sheets

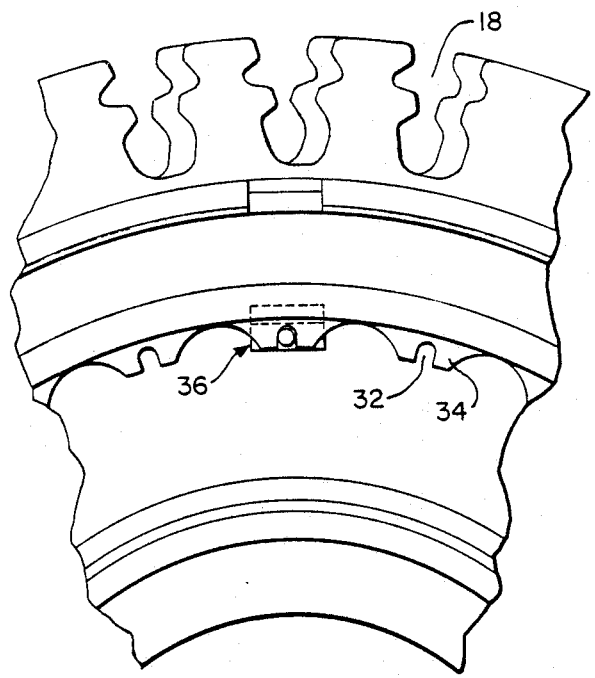
FIG. 3
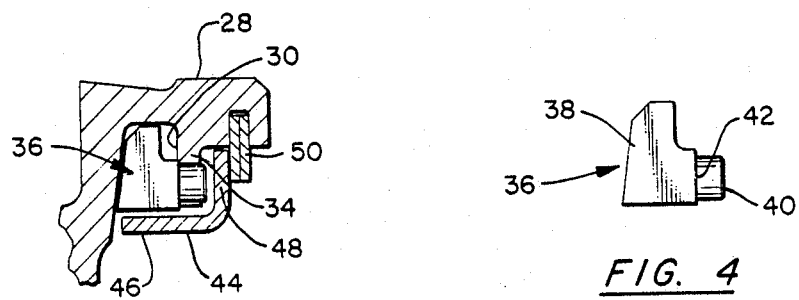
FIG. 2
FIG. 4

HIGH SPEED ROTOR BALANCE SYSTEM

The Government has rights in this invention pursuant to a contract awarded by the Department of the Navy.

TECHNICAL FIELD

The invention relates to gas turbine engine balancing and in particular to the balancing of a compact high speed rotor.

Weighted rotors such as compressors and turbines of gas turbine engines rotated at a high rate of speed. Dynamic unbalance of such rotors leads to severe vibration reducing the useful life of the components.

Small high speed engines rotate in the order of 50,000 RPM. Since the resulting centrifugal forces are large, it is desirable that openings not be placed in the central portion of the disk to receive balance weights because of high stress concentrations produced thereby. Location of weights and a cantilevered collar induces high bending stresses in the collar. It is therefore preferable to have any weight located in such a collar at a location close to the disk center so as to reduce the moment on. Many forms of weights require tools to secure them and accordingly access space between the disk and the weight, thereby increasing the necessary moment on.

Such high speed rotors also experience high windage losses. This not only consumes power, but heats the cooling air passing through the perturbed location.

It is therefore desirable to have a balancing system where weights are located very close to the disk center and a system having low windage loss.

BRIEF DESCRIPTION OF THE DRAWINGS

FIG. 2 is an enlarged sectional view through the collar area.

FIG. 3 is a fragmented aft view of a portion of the disk;

FIG. 4 is a view of the weight.

SUMMARY OF THE INVENTION

Figure 1:
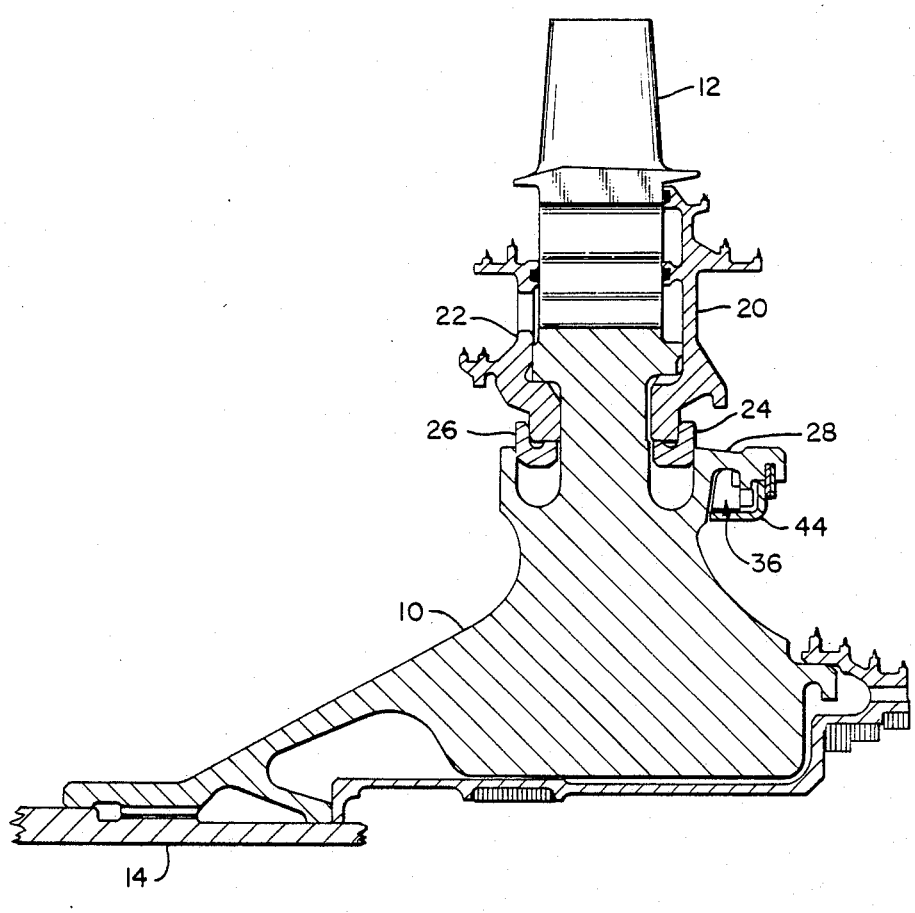
FIG. 1 is an axially sectional elevation through a rotor disk.

The rotor to be balanced includes a bladed disk having a collar secured thereto. The collar includes an inwardly facing circumferential groove adjacent to the disk and a plurality of inwardly facing axial slots contiguous with and outboard of the groove. At least one balance weight is located in the groove as well as in one of the slots.

Circumferential cover plate of L shaped cross section is secured within the collar covering the groove, the weights and the slots. This cover plate is retained by a snap ring so that the cover plate retains the weight at the selected location as well as reducing windage losses.

The weight is preferably sized so as to substantially fill the groove with a majority of the mass located in the groove and an axially extending pin located in the slot. An axially facing shoulder adjacent to the pin and bearing against the collar adjacent to the slots axially retains the weight.

The weight is therefore located extremely close to the disk center and therefore places a relatively low bending moment on the collar. The cover plate retains the weights and reduces the windage loss.

DESCRIPTION OF THE PREFERRED EMBODIMENT

A disk 10 carrying a plurality of blades 12 is secured to a rotor shaft 14, with the assembly rotating at high speed around centerline 16. In the conventional manner the blades 12 are retained in slots 18 and are restrained from axial movement by cover plates 20 and 22. These cover plates are in turn held in place by snap rings 24 and 26, respectively.

Closely spaced collar 28 is secured to the disk with this collar being shown in an enlarged view in FIG. 2. The collar has an inwardly facing circumferential groove 30 for receiving balance weights. It also includes a plurality of inwardly facing axial slots 32 in lip 34.

For balancing, the rotor is rotated at high speed with the location and amount of unbalance determined. Weights 36 are installed to correct this unbalance. Each weight has a major mass 38 which extends in the circumferential direction when installed and a pin 40 which extends in the axial direction when the weight is installed. Each weight also includes a shoulder 42 which bears against lip 34 in the installed position.

Weights are selected of appropriate size and placed at appropriate locations within the collar to correct the unbalance. The majority of mass portion 38 of the weight is located within groove 30 and is sized to substantially fill the groove. A slightly loose fit with a clearance of 0.003 to 0.027 inches is deemed appropriate. The pin 40 fits within slot 32 with a slight clearance in the order of 0.001 to 0.009 inches. This provides sufficient clearance for the weight to locate itself reliably and in a consistent manner during rotation of the disk without providing so much clearance that the weight would jam at an inappropriate location.

A circumferential imperforate cover plate 44 is of L shaped cross section and is located with an axially extending leg 46 covering the inwardly intending side of the groove 30 whether or not there is a weight at the particular location, the inwardly facing side of the weights 36 and the inwardly facing edge of slots 32. A radially extending leg 48 covers the axially extending portion of the weight and the edge of the slots. This L shaped cover 44 is retained in place by snap rings 50.

Plate 44 retains the weights in the designate location and provides a smooth surface to minimize windage loss against the rotating disk. It has been found that the use of the windage cover results in an increase of 4½ horsepower output and a reduction of 28° F. In the temperature rise of the cooling air passing the location of the disk.

I claim:

1. A compact balance system for a high speed gas turbine engine rotor comprising:
   a bladed disk;
   a closely spaced collar secured to said disk, said collar having an inwardly racing circumferential groove and a plurality of inwardly facing axial slots contiguous with, and axially outboard of said groove with respect to said disk;
   at least one balance weight located in said groove and one of said slots, and having an axially extending side;
   a circumferential cover place of L cross section secured within said collar including an axially extending leg covering the inwardly facing side of said groove, weight and slots and having a radially extending leg covering the axially extending side of said weight and slots.

2. A balance system as in claim 1:
said weight sized to substantially fill said groove.

3. A balance system as in claim 2:
said weight having a majority of mass located in said groove, and an axially extending pin located in said slot, and an axially facing shoulder adjacent to said pin and bearing against said collar on each side of said slot.

* * * * *

UNITED STATES PATENT AND TRADEMARK OFFICE
CERTIFICATE OF CORRECTION

PATENT NO. : 4,803,893

DATED : February 14, 1989

INVENTOR(S) : Robert A. Bachinski

It is certified that error appears in the above-identified patent and that said Letters Patent is hereby corrected as shown below:

Column 1, line 5: after "Department of the" delete "Navy" and insert --Army--.

Claim 1, Column 2, line 58: after "inwardly" delete "racing" and insert --facing--.

Claim 1, Column 2, line 65: after "cover" delete "place" and insert --plate--.

Claim 3, Column 4, lines 1 and 2: delete "extending pin located in said slot, and an axially said groove," and insert --said groove, and an axially extending pin located in said slot--.

Signed and Sealed this

Seventh Day of July, 1992

Attest:

DOUGLAS B. COMER

*Attesting Officer*    *Acting Commissioner of Patents and Trademarks*